United States Patent [19]

Narula

[11] Patent Number: 5,087,593
[45] Date of Patent: Feb. 11, 1992

[54] PREPARATION OF TITANIUM NITRIDE FROM ORGANOMETALLIC PRECURSORS

[75] Inventor: Chaitanya K. Narula, Ann Arbor, Mich.

[73] Assignee: Ford Motor Company, Dearborn, Mich.

[21] Appl. No.: 625,180

[22] Filed: Dec. 10, 1990

[51] Int. Cl.$^5$ .............................................. C04B 35/58
[52] U.S. Cl. ....................................... 501/96; 423/411; 427/419.7; 427/419.8
[58] Field of Search ................... 501/96; 423/411, 409; 427/419.7, 419.8; 264/65

[56] References Cited

U.S. PATENT DOCUMENTS 4,482,689 11/1984 Haluska .................................. 528/25

OTHER PUBLICATIONS

Brown, G. M. et al., "Ammonolysis Products of the Dialkylamides of Titanium, Zirconium, and Niobium as Precursors to Metal Nitrides", J. Am Ceram. Soc., 710778-82 (1988).

Saferth, D. et al., "The Preparation of Titanium Nitride and Titanium Carbonitride by the Preceramic Polymer Route", Gov. Rep. Announce Index (U.S.), V. 88 (1988) 827,109.

Bruger, H. et al., "Uber Titan-Stickstoff-Verbindungen, 2-Mitt," Mh. Chem., Bd. 94 (1963) 761.

Andrivanov, K. A. et al., "Reaction of Hexamethyldisilazane with Aluminum and Titanium Halides Methods of Synthesizing Trialkylhalosilanes," Zh. Obsh. Khim, V. 31, N. 10 (1961) 3,410.

*Primary Examiner*—William R. Dixon, Jr.
*Assistant Examiner*—Paul Marcantoni
*Attorney, Agent, or Firm*—Charles H. Ellerbrock; Roger L. May

[57] ABSTRACT

A titanium tetrahalide is reacted with at least one disilazane to prepare a titanium-containing organometallic precursor, which is thereafter pyrolyzed to form crystalline titanium nitride.

20 Claims, No Drawings

PREPARATION OF TITANIUM NITRIDE FROM ORGANOMETALLIC PRECURSORS

FIELD OF THE INVENTION

This invention relates generally to the preparation of titanium nitride from organometallic precursors. More particularly, the invention relates to pyrolyzable organometallic precursor materials and their preparation, and to the pyrolysis of said materials to produce titanium nitride and titanium nitride coated articles.

BACKGROUND OF THE INVENTION

Organometallic precursor processing has been used in recent years to prepare advanced materials such as titanium nitride, silicon carbide, silicon nitride, and boron nitride. This method has several advantages over classical techniques, e.g., relatively low temperature processing requirements, ease of control for maintaining high purity, and formability of the ultimately produced advanced material into fibers, coatings, films, etc. Generally, the organometallic precursors are transformed into the corresponding advanced materials by a pyrolytic process.

Titanium nitride is a particularly useful advanced material having several desirable properties such as, for example, a high melting point (2,950° C.), high hardness (8-9 on the Moh scale), excellent strength (34,000 psi bending strength, and 141,000 psi compression strength), high thermal conductivity, and nonreactivity with a variety of other materials. Furthermore, it is unaffected by acids, excepting aqua regia; however, alkali compounds may cause its decomposition.

The conventional methods for preparing titanium nitride involve the high temperature reaction of a source of titanium such as, for example, titanium tetrachloride or titanium metal, with a source of nitrogen such as, for example, ammonia or nitrogen.

It is known to prepare titanium nitride by the pyrolysis of a polymeric precursor formed by reacting ammonia with a titanium dialkylamide. See Brown, G. M. and Maya, L., "Ammonolysis Products of the Dialkylamides of Titanium, Zirconium, and Niobium as Precursors to Metal Nitrides," Journal of the American Ceramic Society, v. 71 (1988) 78-82. Specifically, a titanium dialkylamide such as, for example, tetrakis(dimethylamido)titanium is reacted with liquid anhydrous ammonia to form an imido- or nitrido-bridged polymeric precursor having the general formula $Ti_2(NX_2)(NH_2) N_3$, wherein X is an alkyl group. Thereafter, the precursor is pyrolyzed in an ammonia atmosphere to prepare titanium nitride. During the initial stages of the pyrolysis process, $NHX_2$ and $NH_3$ are released, forming a compound having the approximate composition $Ti_3N_4$. At a temperature of approximately 700° C. to 800° C., additional nitrogen is released thereby forming partially crystalline titanium nitride.

Also, it is known to prepare titanium nitride by the pyrolysis of a polymeric precursor formed by reacting tetrakis(dimethylamido)titanium with bifunctional amines. See Seyferth, D. and Miganani, G , "The Preparation of Titanium Nitride and Titanium Carbonitride by the Preceramic Polymer Route," Gov. Rep. Announce. Index (US), v. 88 (1988) 827, 109. The publication discloses that tetrakis(dimethylamido)titanium is reacted with a diamine such as, for example, $CH_3NHCH_2CH_2NHCH_3$ to form a polymeric precursor which pyrolyzes under a stream of ammonia to give fairly Pure titanium nitride. Pyrolysis is carried out at a temperature of approximately 800° C. to 1,200° C. to form amorphous titanium nitride, which must thereafter be calcined at approximately 1,500° C. to form crystalline titanium nitride.

In light of the prior art, there is recognized a need for developing a process employing organometallic precursors which are pyrolyzed at lower temperatures to prepare crystalline titanium nitride.

In Bruger, H. and Wannagat, U., "Uber Titan—Stickstoff-Verbindungen, 2.Mitt.," Mh. Chem., Bd. 4 (1963) 761, a process is disclosed for reacting titanium tetrachloride with N,N-bis(trimethylsilyl)amine to produce an adduct, $TiCl_4 \cdot HN[Si(CH_3)_2 \cdot ]_2$. The publication does not teach nor suggest that the organometallic compound would be useful for preparing titanium nitride by a pyrolytic process.

Likewise, Andrianov, K. A., Astakhin, V. V., Kochkin, D. A., and Sukhanova, I. V., "Reaction of Hexamethyldisilazane With Aluminum and Titanium Halides Method of Synthesizing Trialkylhalosilanes," Zh. Obsh. Khim., v. 31, n. 10 (1961) 3,410 discloses a method for Preparing trimethlyhalosilanes by reacting together an equimolar mixture of hexamethyldisilazane and a titanium halide such as, for example, titanium tetrachloride. The authors describe the organometallic reaction byproduct as being $NHTiCl_2$, but do not suggest that the material could be used to form titanium nitride by pyrolysis.

Finally, U.S. Pat. No. 4,482,689 to Haluska discloses a process for preparing polymetallo(disily)silazane polymers, which are useful in the preparation of ceramic materials by pyrolysis in an inert atmosphere or in a vacuum. Specifically, a chlorine-containing disilane, a disilazane such as, for example, hexamethyldisilazane, and a metal halide such as, for example, titanium tetrachloride, are reacted together in an inert, essentially anhydrous atmosphere to Produce a trialkylsilylaminocontaining metallosilazane polymer, which may thereafter be Pyrolyzed at a temperature between 750° C. and 1,200° C. to prepare an amorphous ceramic material containing titanium nitride.

It would be desirable to prepare organometallic precursors, by a simple process, which precursors could be pyrolyzed at lower temperatures than presently disclosed in the prior art, to produce crystalline titanium nitride.

It must be noted that the prior art referred to hereinabove has been collected and examined only in light of the present invention as a guide. It is not to be inferred that such diverse art would otherwise be assembled absent the motivation provided by the present invention, nor that the cited prior art when considered in combination suggests the present invention absent the teachings herein.

SUMMARY OF THE INVENTION

Accordant with the present invention, a process for preparing titanium nitride has surprisingly been discovered, comprising the steps of:

(A) contacting a titanium tetrahalide with at least one disilazane, at a temperature and for a period of time sufficient to prepare a titanium-containing organometallic precursor; and (B) heating the precursor to a temperature and for a period of time sufficient to pyrolyze the precursor.

Moreover, the method for preparing titanium nitride has been found useful for coating substrates by a process, comprising the steps of:
(A) contacting a titanium tetrahalide with at least one disilazane, at a temperature and for a period of time sufficient to prepare a titanium-containing organometallic precursor;
(B) applying the organometallic precursor to the surface of the substrate; and
(C) heating the precursor to a temperature and for a period of time sufficient to pyrolyze the precursor.

The ratio of titanium tetrachloride to disilazane may vary over a wide range, and result in the production of different titanium-containing organometallic precursors. The reaction for preparing the precursor may be carried out in the presence of a solvent, and is generally conducted within a temperature range from about $-100°$ C. to about $100°$ C. Pyrolysis of the organometallic precursors of the present invention occurs generally at temperatures at least about $600°$ C., in contrast to pyrolysis reactions disclosed in the prior art which require temperatures in the range of $800°$ C. and greater.

The process of the present invention is useful for preparing titanium-containing organometallic precursors which are thereafter pyrolyzed to produce crystalline titanium nitride. The titanium nitride so produced is particularly suited for coating the surfaces of articles such as internal combustion engine components, to provide wear resistance and corrosion protection therefor.

DETAILED DESCRIPTION OF THE PREFERRED EMBODIMENT

The present invention is directed to the preparation of titanium-containing organometallic precursors, and the subsequent pyrolysis of said precursors, to form titanium nitride. This novel process involves the reaction of a titanium tetrahalide and at least one disilazane to prepare an organometallic precursor, and the subsequent pyrolysis of said precursor to form titanium nitride.

The first reactant for use in preparing the organometallic precursors of the present invention is a titanium tetrahalide. Titanium tetrahalides are well known compounds to those ordinarily skilled in the chemical arts, and include $TiCl_4$, $TiBr_4$, $TiF_4$, and $TiI_4$. A preferred titanium tetrahalide is titanium tetrachloride, which may be produced by heating a quantity of titanium dioxide or a titanium-containing ore along with carbon while passing a stream of chlorine gas thereover. Details concerning the manufacture and characteristics of titanium tetrahalides are more fully set forth in the Kirk-Othmer Concise Encyclopedia of Chemical Technology, John Wiley & Sons, New York (1985) p. 1185-1186.

The second reactant for use in preparing the organometallic precursors according to the present invention is at least one disilazane having the general formula:

$R_3SiNHSiR_3$ (I)

wherein each R, independently, is hydrogen, a monovalent alkyl radical having 1-3 carbon atoms, phenyl, or a vinyl radical. Examples of contemplated equivalent disilazanes having the same operability and utility are, without limitation, $(CH_3)_3SiNHSi(CH_3)_3$, $(C_6H_5)(CH_3)_2SiNHSi(CH_3)_2(C_6H_5)$, $(CH_2=CH)(CH_2=CH)_2SiNHSi(CH_3)_2(CH=CH_2)$, $(C_6H_5)(CH_2=CH)(CH_3)SiNH$-$Si(CH_3)(CH=CH_2)(C_6H_5)$, $(CH_2=CH)(C_6H_5)_2SiNHSi(C_6H_5)_2(CH=CH_2)$, $(CH_2=CH)(C_2H_5)_2SiNHSi(C_2H_5)_2(CH=CH_2)$, $(CH_2=CH)(C_6H_5)(C_2H_5)SiNHSi(C_2H_5)(C_6H_5)(CH=CH_2)$, $H(CH_3)_2SiNHSi(CH_3)_2H$, $H_2(CH_3)SiNHSi(CH_3)H_2$, and $H(C_6H_5)(CH_3)SiNHSi(CH_3)(C_6H_5)H$. Mixtures of disilazanes may likewise conveniently be used for the second reactant. A Preferred disilazane is hexamethyldisilazane.

Preparation of the titanium-containing organometallic Precursors according to the Present invention conveniently may be carried out by admixing the titanium tetrahalide and disilazane reactants under rigorously anhydrous conditions. The mixture of reactants may optionally include a solvent which does not react with the titanium tetrahalide such as, for example, dichloromethane, carbon tetrachloride, toluene, benzene, pentane, hexane, etc. A preferred solvent is dichloromethane. The solvent may comprise up to about 80% by weight of the reaction mixture. The ratio of titanium tetrachloride to disilazane employed in the reaction mixture may vary on a molar basis from about 1:0.5 to about 1:3. Preferably the ratio is from about 1:1 to about 1:2. The reaction is generally effected at temperatures in the range from about $-100°$ C. to about $100°$ C. Preferably, the reaction is carried out at about room temperature from about $20°$ C. to about $30°$ C. The time required for complete reaction to occur is not sharply critical, and may vary over wide limits from several minutes to several hours. Thus, the titanium-containing organometallic precursors form from the reaction mixture as a precipitate which may be vacuum stripped to prepare a free flowing powder prior to the pyrolysis operation.

While not wishing to be bound by any particular theory regarding the formation and composition of the titanium-containing organometallic precursors, it is believed that specific precursor compounds are generated, which are distinct based upon the ratio of starting reactants.

In the case where an equimolar mixture of a titanium tetrahalide and at least one disilazane are reacted together, mass balance calculations and infrared spectral analyses of the resultant organometallic Precursor seem to suggest that the following imido-bridged structure is formed:

$R_3Si[NHTiZ_2]_xNHSiR_3$ (II)

wherein R is as defined hereinabove, Z is a halo radical, and x is from about 1 to about 20. These structures may be highly Crosslinked via interactions between halo and/or trimethylsilylamino bridges.

In a preferred embodiment of the present invention, wherein titanium tetrachloride is reacted with two molar equivalents of at least one disilazane, analysis suggests that the following diimido-bridged structure is formed:

$R_3SiNH(TiClNH)_2NHSiR_3$ (III)

wherein R is as defined hereinabove. These structures may initially crosslink via the formation of NH bridges, in combination with the loss of chlorotrimethylsilane. Thereafter, further crosslinking may occur via bridging between chloro, amino, and/or trimethylsilylamino groups The titanium-containing organometallic percursors are separated from the reaction mixtures by conventional methods well known in the art, and thereafter pyrolyzed in an inert atmosphere, to form titanium nitride. The inert atmosphere may be, for example, ammonia, nitrogen, argon or mixtures thereof, or a vacuum. A preferred inert atmosphere is ammonia. Pyrolysis of the organometallic precursors to form titanium nitride conveniently occurs at a temperature of at least about 600° C., which is significantly below the temperatures disclosed in the prior art as useful for pyrolyzing titanium-containing polymeric precursors. The time required for complete pyrolysis may vary over wide limits, depending upon the rate at which the organometallic precursor is heated, from several minutes to several hours.

The process for preparing titanium nitride according to the present invention is suitable for depositing a layer of titanium nitride onto a substrate. The precursor may be applied to the surface of the substrate by any conventional method, such as by molding or casting, and thereafter pyrolyzed to form the titanium nitride coating.

Alternatively, a layer of the organometallic precursor may be formed on the surface of the substrate by causing the Precursor to precipitate from the reaction solution and simultaneously deposit directly onto the substrate, after which the organometallic precursor is pyrolyzed to form the titanium nitride coating. Such coatings are advantageous, for example, for lining parts of apparatus such as internal combustion engine components to be protected against corrosion and oxidation at high temperatures. The resultant coatings are crystalline titanium nitride.

EXAMPLE 1

Preparation of Organometallic Precursor

A 250 ml three-neck flask fitted with a condenser is charged with titanium tetrachloride (about 6.9 g, 36.3 mmol). Hexamethyldisilazane (about 5.87 g, 36.3 mmol) is added to the flask slowly with a syringe at room temperature. The reaction mixture is stirred continuously during the addition of the hexamethyldisilazane. An orange-colored precipitate immediately forms from the reaction mixture. Following a period of thorough agitation of the reaction mixture, the volatile materials are removed by evacuation, leaving about 6.31 grams of an orange-colored titanium-containing organometallic precursor powder. The precursor has a chemical composition represented by formula II.

EXAMPLE 2

Preparation of Organometallic Precursor

The admixing procedure described in Example 1 is repeated, excepting that about 11.75 g (72.8 mmol) of hexamethyldisilazane is reacted with about 6.9 g (36.2 mmol) of titanium tetrachloride. A yellow-orange precipitate forms from the reaction mixture. The reaction mixture is subsequently heated to about 70° C. for about two hours, cooled to room temperature, and the volatile components removed by evacuation resulting in about 7.60 g of a free flowing yellow powder. The yellow-colored titanium-containing organometallic precursor has a chemical composition represented by formula III.

EXAMPLE 3

Preparation of Organometallic Precursor

The admixing procedure described in Example 1 is repeated, excepting that about 11.75 g (72.8 mmol) of hexamethyldisilazane is added to a solution of about 6.90 g (36.4 mmol) of titanium tetrachloride in about 130g of dichloromethane at a temperature of about −78° C. The reaction mixture which is initially clear, is allowed to warm slowly to about room temperature, during which a yellow precipitate forms at about −20° C. The precipitate is isolated as in Example 1 yielding about 7.86 g of a yellow-colored titanium-containing organometallic precursor powder having a chemical composition represented by formula III.

EXAMPLE 4

Pyrolysis of Organometallic Precursor

A quantity of organometallic precursor prepared as in Example 1 is placed in a quartz tube connected to a system which maintains a nitrogen atmosphere within the tube. The precursor is slowly heated to about 600° C. and maintained at that temperature for about five hours. During the heating procedure, the organometallic precursor experiences about a 30% weight loss in the 50° C. to 100° C. range, and about an additional 37% weight loss in the 100° C. to 400° C. range. Volatile components given off during the heating procedure are identified as ammonia and ammonium chloride. Upon completion of the pyrolysis procedure, a black-colored powder remains which is indicated by X-ray powder diffraction analysis to be crystalline titanium nitride.

EXAMPLE 5

Pyrolysis of Organometallic Powder

The procedure of Example 4 is repeated, exception that a quantity of organometallic precursor as obtained in Example 2 is used. Analysis of the resultant black-colored powder indicates that it is crystalline titanium nitride.

EXAMPLE 6

Pyrolysis of Organometallic Precursor

A quantity of organometallic precursor prepared as in Example 1 is reacted with excess liquid ammonia, and the excess ammonia is allowed to evaporate. Thereafter, the pyrolysis procedure described in Example 4 is repeated, resulting in a dark-olive-brown material which is indicated by X-ray powder diffraction analysis to be crystalline titanium nitride.

EXAMPLE 8

Pyrolysis of Organometallic Precursor

A quantity of organometallic precursor prepared as in Example 1 is pyrolyzed according to the procedure described in Example 4, excepting that an ammonia atmosphere is maintained within the tube. During the procedure, the organometallic precursor experiences about 12% weight loss in the 50° C. to 100° C. range, and about an additional 37% weight loss in the ° C to 180° C. range. A golden-red-brown material is produced which by analysis is indicated to be crystalline titanium nitride.

EXAMPLE 9

Pyrolysis of Organometallic Precursor

The procedure of Example 8 is repeated, excepting that a quantity of organometallic precursor as obtained in Example 2 is used. Analysis of the resultant golden-red-brown material indicates that it is crystalline titanium nitride.

EXAMPLE 10

Pyrolysis of Organometallic Precursor Deposited on a Substrate

Non-porous magnesium oxide single crystal substrates are prepared by burning magnesium turnings, and collecting the resultant magnesium oxide smoke particles. A solution of about 0.48 g of titanium tetrachloride in about 60 g of dichloromethane is prepared at a temperature of about $-78°$ C. Hexamethyldisilazane (about 0.73 g) is added to the titanium tetrachloride solution according to the procedure as described in Example 3. After warming the reaction mixture to about $-20°$ C., the magnesium oxide crystals (about 0.25 g) are added. The stirred reaction mixture is thereafter heated to about room temperature, and the volatile components removed by evacuation. Thus, magnesium oxide particles coated with a yellow-colored titanium-containing organometallic precursor are formed.

The precursor coated magnesium oxide particles are thereafter pyrolyzed under an ammonia atmosphere at about 600° C. for about 4 hours, thereby producing crystalline titanium nitride coated magnesium oxide particles. X-ray powder diffraction analysis of the material indicates TiN and MgO in a ratio of about 1:4.

EXAMPLE 11

Pyrolysis of Organometallic Precursor Deposited on a Substrate

Magnesium oxide substrate particles are prepared as described in Example 10, and organometallic precursor is prepared as described in Example 2. The magnesium oxide particles (about 0.25 g) are mixed with about 1.0 g of the organometallic precursor, and ground together in a mortar. The mixture is pyrolyzed at about 600° C. for about one hour under ammonia. The resultant sample is then heated to about 1,000° C. for about four hours. X-ray powder diffraction analysis indicates that the sample comprises crystalline TiN and MgO. It is observed that a large number of particles have joined together to form agglomerates.

These examples may be repeated with similar success by substituting the generically or specifically described reactants and/or reaction conditions recited herein for those used in the preceeding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing titanium nitride, consisting essentially of the steps of:
   (A) contacting a titanium tetrahalide with at least one disilazane, at a temperature and for a period of time sufficient to prepare a titanium-containing organometallic precursor; and
   (B) heating the precursor to a temperature and for a period of time sufficient to pyrolyze the precursor.

2. The process for preparing titanium nitride according to claim 1, wherein the titanium tetrahalide is titanium tetrachloride.

3. The process for Preparing titanium nitride according to claim 1, wherein the disilazane is hexamethyldisilazane.

4. The process for preparing titanium nitride according to claim 1, wherein the mole ratio of titanium tetrahalide to disilazane is from about 1:0.5 to about 1:3.

5. The process for preparing titanium nitride according to claim 4, wherein the mole ratio is from about 1:1 to about 1:2.

6. The process for Preparing titanium nitride according to claim 1, wherein step A is conducted in the presence of a solvent.

7. The process for preparing titanium nitride according to claim 1, wherein step A is conducted at a temperature from about $-100°$ C. to about 100° C.

8. The process for preparing titanium nitride according to claim 1, wherein step B is conducted at a temperature of at least about 600° C.

9. A process for preparing titanium nitride, consisting essentially of the steps of:
   (A) contacting titanium tetrachloride with at least one disilazane including hexamethyldisilazane, the mole ratio of titanium tetrachloride to disilazane being from about 1:1 to about 1:2, optionally in the presence of a solvent, at a temperature from about $-100°$ C. to about 100° C. and for a period of time sufficient to prepare a titanium-containing organometallic precursor; and
   (B) heating the precursor to a temperature at least about 600° C. and for a period of time sufficient to Pyrolyze the precursor.

10. A process for applying a layer of titanium nitride to a surface of a substrate, comprising the steps
    (A) contacting a titanium tetrahalide with at least one disilazane, at a temperature and for a period of time sufficient to prepare a titanium-containing organometallic precursor;
    (B) applying the organometallic precursor to the surface of the substrate; and
    (C) heating the precursor to a temperature and for a period of time sufficient to pyrolyze the precursor.

11. The process for applying a layer of titanium nitride to a surface of a substrate according to claim 10, wherein the titanium tetrahalide is titanium tetrachloride.

12. The process for applying a layer of titanium nitride to a surface of a substrate according to claim 10, wherein the disilazane is hexamethyldisilazane.

13. The process for applying a layer of titanium nitride to a surface of a substrate according to claim 10, wherein the mole ratio of titanium tetrahalide to disilazane is from about 1:0.5 to about 1:3.

14. The process for applying a layer of titanium nitride to a surface of a substrate according to claim 13, wherein the mole ratio is from about 1:1 to about 1:2.

15. The process for applying a layer of titanium nitride to a surface of a substrate according to claim 10, wherein step A is conducted in the presence of a solvent.

16. The process for applying a layer of titanium nitride to a surface of a substrate according to claim 10, wherein step A is conducted at a temperature from about $-100°$ C. to about 100° C.

17. The process for applying a layer of titanium nitride to a surface of a substrate according to claim 10, wherein step B is conducted at a temperature of at least about 600° C.

18. The process for applying a layer of titanium nitride to a surface of a substrate according to claim 10, wherein steps A and B are conducted simultaneously.

19. A process for applying a layer of titanium nitride to a surface of a substrate, consisting essentially of the steps of:
(A) contacting titanium tetrachloride with at least one disilazane including hexamethyldisilazane, the mole ratio of titanium tetrachloride to disilazane being from about 1:1 to about 1:2, optionally in the presence of a solvent, at a temperature from about −100° C. to about 100° C. and for a period of time sufficient to prepare a titanium-containing organometallic precursor;
(B) applying the organometallic precursor to the surface of the substrate; and
(C) heating the precursor to a temperature of at least about 600° C. and for a period of time sufficient to pyrolyze the precursor.

20. The process for applying a layer of titanium nitride to a surface of a substrate according to claim 19, wherein steps A and B are conducted simultaneously.

* * * * *